(12) United States Patent
Vaizman et al.

(10) Patent No.: US 12,047,834 B2
(45) Date of Patent: Jul. 23, 2024

(54) LOCATING DEVICES WITHIN A PREMISES

(71) Applicant: Comcast Cable Communications, LLC, Philadelphia, PA (US)

(72) Inventors: Yonatan Vaizman, Washington, DC (US); Hongcheng Wang, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/249,582

(22) Filed: Mar. 5, 2021

(65) Prior Publication Data

US 2022/0286805 A1    Sep. 8, 2022

(51) Int. Cl.
| | | |
|---|---|---|
| H04W 4/021 | (2018.01) | |
| G01S 5/02 | (2010.01) | |
| H04W 8/22 | (2009.01) | |
| H04W 24/08 | (2009.01) | |

(52) U.S. Cl.
CPC ......... *H04W 4/021* (2013.01); *G01S 5/02521* (2020.05); *H04W 8/22* (2013.01); *H04W 24/08* (2013.01)

(58) Field of Classification Search
CPC ....... H04W 4/021; H04W 8/22; H04W 24/08; G01S 5/02521
USPC ...................................................... 455/456.1
See application file for complete search history.

(56) References Cited

U.S. PATENT DOCUMENTS

| | | | |
|---|---|---|---|
| 7,502,619 B1 | 3/2009 | Katz | |
| 9,888,475 B2 * | 2/2018 | Wolcott | H04H 20/81 |
| 9,936,356 B2 * | 4/2018 | Jeong | H04W 4/80 |
| 10,045,150 B2 | 8/2018 | Zakaria | |
| 10,117,048 B2 * | 10/2018 | Sugatoor | H04W 4/021 |
| 10,228,453 B2 * | 3/2019 | Kuang | G01S 5/02521 |
| 10,524,225 B1 * | 12/2019 | Boross | G01S 5/0295 |
| 10,812,942 B2 * | 10/2020 | Keal | H04W 4/025 |
| 10,884,112 B2 * | 1/2021 | Yang | G01S 11/06 |
| 10,959,044 B1 * | 3/2021 | Gurin | H04W 4/021 |
| 11,089,433 B2 * | 8/2021 | Stitt | H04W 4/023 |
| 11,290,977 B1 * | 3/2022 | Chinnapalli | G01S 5/14 |
| 11,363,425 B2 * | 6/2022 | Zhao | G01S 19/39 |
| 11,405,753 B2 * | 8/2022 | Lu | H04B 17/27 |
| 2007/0142061 A1 | 6/2007 | Taubenheim et al. | |
| 2008/0176583 A1 | 7/2008 | Brachet et al. | |
| 2010/0238862 A1 * | 9/2010 | Davidson | G01S 5/0268 370/328 |

(Continued)

FOREIGN PATENT DOCUMENTS

| | | |
|---|---|---|
| CA | 2558394 C | 1/2011 |
| JP | 54-019891 B2 | 2/2014 |

*Primary Examiner* — Mong-Thuy T Tran

(74) *Attorney, Agent, or Firm* — BakerHostetler

(57) ABSTRACT

Methods and systems are disclosed for estimating locations of devices operating on a network (such as a wireless network) in a premises. Signal strength measurements of signals sent by the devices may be used to estimate locations of the devices within the premises as well as to estimate anchor points where signals are received from the devices. The devices may be shown on a map of the premises. The anchor points may be shown on a map of the premises. A method may be implemented iteratively to estimate the device locations as well as the locations of the anchor points. Estimated locations of devices and/or anchor points may be used to estimate a location of a device misplaced or lost in the premises.

20 Claims, 12 Drawing Sheets

(56) References Cited

U.S. PATENT DOCUMENTS

| | | | |
|---|---|---|---|
| 2015/0264536 A1* | 9/2015 | Patil | H04W 4/33 |
| | | | 455/456.1 |
| 2015/0365787 A1* | 12/2015 | Farrell | H04W 4/02 |
| | | | 455/456.1 |
| 2017/0171718 A1* | 6/2017 | Jeong | G01S 5/0294 |
| 2018/0306894 A1* | 10/2018 | Koskimies | G01S 5/0278 |
| 2019/0007924 A1* | 1/2019 | Chen | H04W 4/027 |
| 2019/0075424 A1* | 3/2019 | Zakaria | H04L 67/12 |
| 2019/0208361 A1* | 7/2019 | Chang | H04W 4/024 |
| 2019/0281794 A1* | 9/2019 | Ehrman | A01K 27/009 |
| 2020/0302452 A1* | 9/2020 | Platt | H10K 85/657 |

* cited by examiner

| | MAC ID (Camera 102) | MAC ID (Smoke Detector 144) | MAC ID (Thermostat 152) | MAC ID (User Device 150) | MAC ID (TV 160) | MAC ID (TV 130) | MAC ID (User Device 136) | MAC ID (Computer 114) | MAC ID (Gateway 108) | Etc. |
|---|---|---|---|---|---|---|---|---|---|---|
| Anchor 1 | RSSI | RSSI | RSSI | RSSI | RSSI | RSSI | RSSI | RSSI | RSSI | RSSI |
| Anchor 2 | RSSI | RSSI | RSSI | RSSI | RSSI | RSSI | RSSI | RSSI | RSSI | RSSI |
| Anchor 3 | RSSI | RSSI | RSSI | RSSI | RSSI | RSSI | RSSI | RSSI | RSSI | RSSI |
| Anchor 4 | RSSI | RSSI | RSSI | RSSI | RSSI | RSSI | RSSI | RSSI | RSSI | RSSI |
| Anchor 5 | RSSI | RSSI | RSSI | RSSI | RSSI | RSSI | RSSI | RSSI | RSSI | RSSI |
| Anchor 6 | RSSI | RSSI | RSSI | RSSI | RSSI | RSSI | RSSI | RSSI | RSSI | RSSI |
| Anchor 7 | RSSI | RSSI | RSSI | RSSI | RSSI | RSSI | RSSI | RSSI | RSSI | RSSI |
| Anchor 8 | RSSI | RSSI | RSSI | RSSI | RSSI | RSSI | RSSI | RSSI | RSSI | RSSI |
| Anchor 9 | RSSI | RSSI | RSSI | RSSI | RSSI | RSSI | RSSI | RSSI | RSSI | RSSI |
| Anchor 10 | RSSI | RSSI | RSSI | RSSI | RSSI | RSSI | RSSI | RSSI | RSSI | RSSI |
| Anchor 11 | RSSI | RSSI | RSSI | RSSI | RSSI | RSSI | RSSI | RSSI | RSSI | RSSI |
| Anchor 12 | RSSI | RSSI | RSSI | RSSI | RSSI | RSSI | RSSI | RSSI | RSSI | RSSI |
| Anchor 13 | RSSI | RSSI | RSSI | RSSI | RSSI | RSSI | RSSI | RSSI | RSSI | RSSI |
| Anchor 14 | RSSI | RSSI | RSSI | RSSI | RSSI | RSSI | RSSI | RSSI | RSSI | RSSI |

FIG. 3

| | Label for Anchor Point | Coordinates | MAC ID (Camera 102) | MAC ID (Smoke Detector 144) | MAC ID (Thermostat 152) | MAC ID (User Device 156) | MAC ID (TV 162) | MAC ID (TV 138) | MAC ID (User Device 136) |
|---|---|---|---|---|---|---|---|---|---|
| Anchor 1 | Entry to Laundry Room | X, Y, Z | RSSI | RSSI | RSSI | RSSI | RSSI | RSSI | RSSI |
| Anchor 2 | Middle of Laundry Room | X, Y, Z | RSSI | RSSI | RSSI | RSSI | RSSI | RSSI | RSSI |
| Anchor 3 | Entry to Kitchen | X, Y, Z | RSSI | RSSI | RSSI | RSSI | RSSI | RSSI | RSSI |
| Anchor 4 | Middle of Kitchen | X, Y, Z | RSSI | RSSI | RSSI | RSSI | RSSI | RSSI | RSSI |
| Anchor 5 | Halfway down Hallway | X, Y, Z | RSSI | RSSI | RSSI | RSSI | RSSI | RSSI | RSSI |
| Anchor 6 | Middle of Living Room | X, Y, Z | RSSI | RSSI | RSSI | RSSI | RSSI | RSSI | RSSI |
| Anchor 7 | Outside Bedroom Entry | X, Y, Z | RSSI | RSSI | RSSI | RSSI | RSSI | RSSI | RSSI |
| Anchor 8 | Inside Bedroom Entry | X, Y, Z | RSSI | RSSI | RSSI | RSSI | RSSI | RSSI | RSSI |
| Anchor 9 | Middle of Bedroom | X, Y, Z | RSSI | RSSI | RSSI | RSSI | RSSI | RSSI | RSSI |
| Anchor 10 | Outside Bathroom Entry | X, Y, Z | RSSI | RSSI | RSSI | RSSI | RSSI | RSSI | RSSI |
| Anchor 11 | Inside Den Entry | X, Y, Z | RSSI | RSSI | RSSI | RSSI | RSSI | RSSI | RSSI |
| Anchor 12 | Middle of Den | X, Y, Z | RSSI | RSSI | RSSI | RSSI | RSSI | RSSI | RSSI |
| Anchor 13 | Hallway | X, Y, Z | RSSI | RSSI | RSSI | RSSI | RSSI | RSSI | RSSI |
| Anchor 14 | Across from Kitchen Entry | X, Y, Z | RSSI | RSSI | RSSI | RSSI | RSSI | RSSI | RSSI |

902
Measure, at a first location, a first strength of a first signal received from a first device

↓

904
Measure, at the first location, a second strength of a second signal received from a second device

↓

906
Estimate the first location based on the first strength, the second strength, an estimated location of the first device, and an estimated location of the second device

↓

908
Receive a label for the first location and second location

↓

910
Receive a coordinate for the first location and second location

FIG. 9

LOCATING DEVICES WITHIN A PREMISES

BACKGROUND

Networks within premises such as homes and offices may comprise numerous devices. Users may be able to obtain a list of devices connected to, for example, a wireless network in a premises, but such a list may not indicate which devices are in which locations within a premises. Additionally, devices such as laptops and tablets may become lost or misplaced in a premises and a user may be unable to find such misplaced or lost devices. It may be desirable to determine or estimate locations of devices within a premises and depict such locations on a map or other visualization of a premises.

SUMMARY

Methods and systems are disclosed for determining or estimating a location of one or more devices within a premises. Strength of signals sent by the devices may be measured at one or more anchor points. Such signal-strength measurements may be used to estimate the location of the anchor points. Such estimated anchor points may be used to estimate the location of the devices. Estimating anchor point locations and device locations may be performed over the course of iterations. Such estimations may comprise estimating a gain characteristic for each of the devices within a premises that indicates a strength or power with which each device sends signals on the premises's network. Such gain estimates for each device may further be used in determining or estimating device locations and anchor points. A map of a premises may be generated from the estimated device locations to visually show where the devices may be located within the premises. This map and the estimated locations may be used to estimate anchor point locations and further may be used to estimate a location of a lost device such as a laptop or tablet misplaced under a bed, for example.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 3 shows example signal strength measurements at anchor points;
FIG. 7 shows example signal strength measurements at anchor points;
FIG. 9 shows an example method.

DETAILED DESCRIPTION

Figure 1:
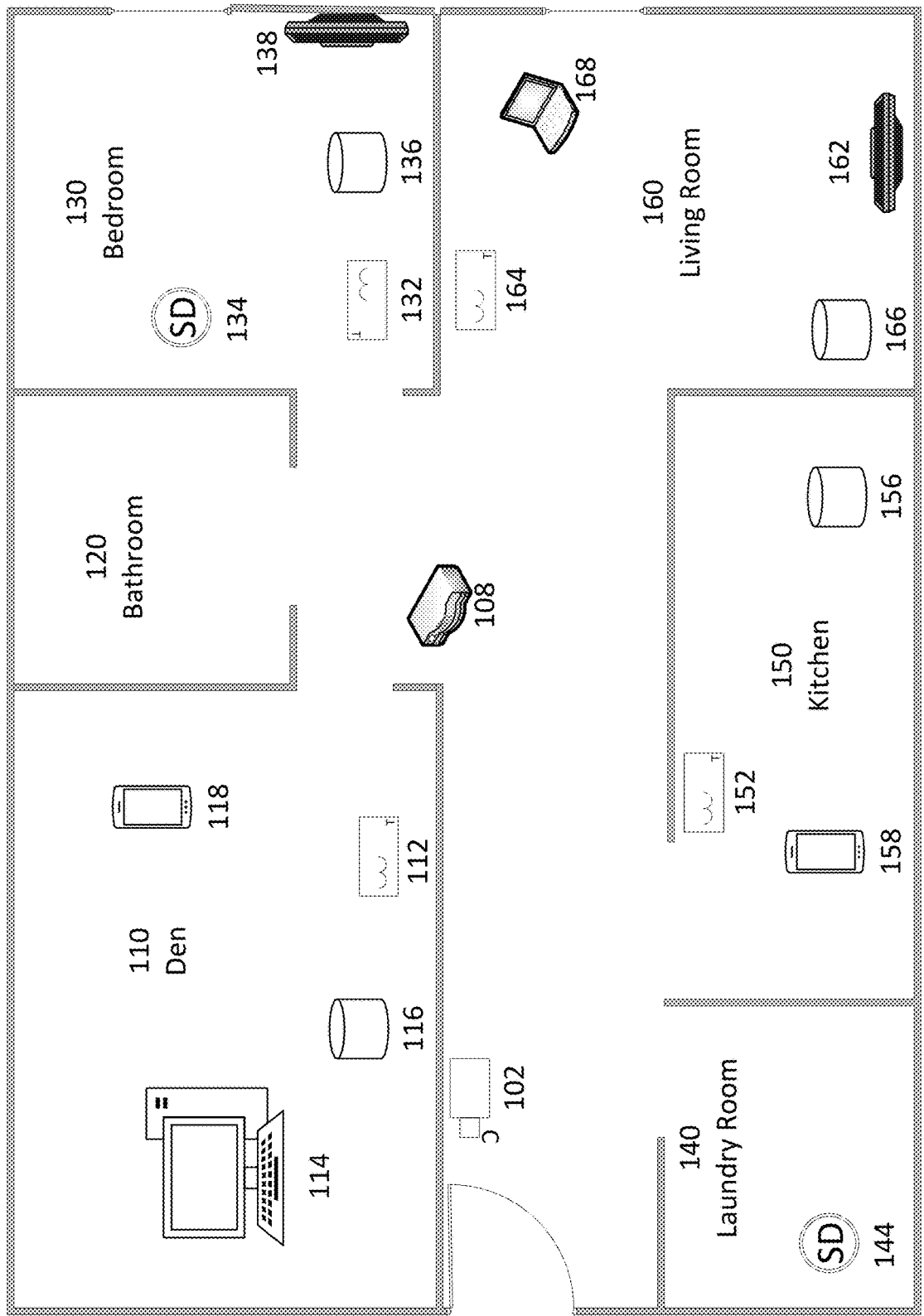
FIG. 1 shows an example premises network.

FIG. 1 shows an example network in a premises 100. The premises 100 may be any location such as a residence, a house, an apartment, an office, a commercial building, or the like. The premises 100 may comprise various rooms such as, for example, a den 110, a bathroom 120, a bedroom 130, a laundry room 140, a kitchen 150 or a living room 160. Premises 100 may comprise any number of rooms and any number of levels or floors. The premises 100 may comprise a network of devices. The network may comprise any type of network such as a wireless or WIFI network. The devices communicating on the network may be configured to communicate with each other, and/or with other devices, computers, servers, etc., physically and/or logically located outside of the premises 100. Such devices in the premises may comprise, for example, a desktop computer 114 in the den 110. Such desktop computer may be stationary in that it largely remains, for example, on a desk in the den 110. Other devices may be mobile such as, for example, a smart phone 118 currently shown in FIG. 1 located in the den 110. A user device 116 may be located in the den 110. Such user device 116 may comprise, for example, a handsfree device that may be a voice activated device configured to receive audio data spoken by a user. The spoken audio data may be received by the user device 116 as an audio input. For example, the user device 116 may be configured to receive a voice command spoken by a user of the user device 116. As a result of receiving such a voice command, the user device 116 may further be configured to perform an action dictated, for example, by the voice command such as respond to a question, provide information, execute a search, execute some other commanded action such as one associated with Internet-of-Things technology (e.g., turn on a light, lower a thermostat), or perform any other action for which the user device 116 is designed. A thermostat 112 may be located in the den 110 that is communicatively coupled to the network in the premises and, for example, to the Internet. The computer 114, the user device 116, the thermostat 112 and the smartphone 118 may be configured to communicate with, for example, a wireless network in the premises 100 and additionally, or alternatively, may be configured to communicate via a gateway 108 with devices on another network such as the Internet.

One or more devices may be located in the bedroom 130, and such devices may also be configured to communicate via the network in the premises 100. For example, a smoke detector 134 and a television 138 may be located in the bedroom. Another thermostat 132 and another user device 136 may also be located in the bedroom 130. The smoke detector 134, the television 138, the thermostat 132 and the user device 136 may be configured to communicate with the wireless network in the premises 100 via, for example, the gateway 108 and may communicate via the gateway 108 with other devices on, for example, the Internet.

A smoke detector 144 may be located in the laundry room 140, and a second smartphone 158 may be located in the kitchen 150 along with a third user device 156 and a third thermostat 152. A laptop computer 168, a fourth user device 166, a second television 162, and a fourth thermostat 164 may be located in the living room 160. The smoke detector 144, the smartphone 158, the user device 156, the thermostat 152, the laptop computer 168, the user device 166, the television 162 and the thermostat 164 may be configured to communicate with the wireless network in the premises 100 and with other devices on the wireless network in the premises 100, and may communicate via the gateway 108 with other devices on, for example, the Internet.

Wireless-network management frameworks for premises such as premises 100 may present the devices, such as the devices shown for example purposes in the den 110, the bedroom 130, the laundry room 140, the kitchen 150, and the living room devices in a list. In some cases, it may be hard to identify which device is which (e.g., thermostats 112, 132, 152, 164; user devices 116, 136, 156, 166; smartphones 118, 158; smoke detectors 134, 144; televisions 138, 162). Therefore, it may be difficult to understand a long list of devices and even more so with numerous devices of the same type. Such a list may be difficult to manage. For example, it may be difficult to understand whether a thermostat in the list is in a bedroom, a den, a living room or elsewhere. Therefore, a solution to this challenge may be to present devices in a premises, such as premises 100, on a map or other visualization to demonstrate not only what devices are in communication, whether directly or indirectly, with the gateway 108 or on a wireless network but also where, in a premises, the devices may be located. Such a map or visualization may appear similar to that shown in FIG. 1. To manage devices such as those shown in FIG. 1, users may be provided the capability to name devices and/or to bunch them into profiles.

To map or provide another visualization, cellular network tower-based geolocation may use a cellular telephone's radio signal strength to multiple cellular towers to triangulate and identify the phone's location. However, such a method may not be completely effective in a wireless network such as a network shown in FIG. 1. Additionally, spatial resolution in such a location technique may not be tight enough for use within a premises such as premises 100. Alternatively or additionally, geolocation using satellites such as in a GPS system may be less than what may be required to locate devices within a premises such as the premises 100 because many devices, such as many of the devices shown in FIG. 1, may not have capability with a GPS or other satellite system. In addition, GPS or other satellite systems may not have the reception capability for use with devices inside structures such as premises 100.

Signals such as radio signals (e.g., wireless-network or WiFi signals) sent by devices such as those shown in FIG. 1 may be used to locate the devices in premises for various purposes—e.g., to provide a map or for mapping device locations within a premises or to find a lost device, etc. Such signals may provide for fine-resolution pin-pointing of device locations inside the premises, and use of many diverse measurement positions inside the premises may aid in such activities. Additionally, one or more methods described herein may allow for utilizing unknown measurement locations (unlike the cell tower approach, where the cell towers may be few as well as fixed in known locations). One or more methods may be performed as a one-time procedure, for example, to map or for mapping stationary devices (including stationary devices such as cameras, printers, fixed computers, desktop computers, or televisions, for example) or mobile or portable devices (such as smart phones, cellular phones, smart devices, handheld devices, user devices such as handsfree devices, laptop computers, or tablet computers, for example). One or more methods may be performed on, for example, an as-needed basis to obtain a current map of, or for mapping, devices in the past few minutes and/or to find a lost device (e.g., a tablet lost under a bed, etc.).

Taking signal-strength measurements, a user such as an owner or occupant of a premises (or, of course, anyone else) may use a device such as, for example, a mobile or portable device (cellular phone, smart phone, smart device, tablet, laptop, and the like) on which may be loaded a software or application (app) and walk around the premises to measure signal strengths. The device may be referred to herein as a "measuring device"—that is a mobile or portable device configured to measure signal strength of signals. While walking, the measuring device may be measuring or "sniffing" a network in the premises such as a wireless (e.g., WiFi) network. The measuring device may be listening to a radio channel associated with the network and may capture packets such as, for example, wireless or WiFi packets. The measuring device may measure the radio-signal strength of these signals or packets as they reach the measuring device's antenna. Signal strength may be a clue for how close the device sending the signal may be to the measuring device. Of course, different measuring devices may be used to measure signal strength at different locations.

A signal or packet that a device, such as one of the devices shown in FIG. 1, sends may be transmitted through a network of the premises such as a wireless network, a WiFi network, or the like. For example, the device may use a radio channel and send a message physically as a radio signal through the air in the premises. An antenna within the premises, for example, may sense that signal. A device listening to a radio channel within the premises may verify the addressee of the packet (e.g., the device to which the packet is directed, targeted, or sent) and may further disregard the packet if the packet is not targeted for it. However, sniffing may be performed by such a device nonetheless, even if the packet is not directly addressed to it. For example, if a device in the premises such as the thermostat 152 in the kitchen 150 is communicating via the gateway 108 with another device such as a webserver on the Internet, it may send a packet addressed to a web address associated with that webserver, and that packet may be first sent through the gateway 108. The thermostat 152 may send a packet via radio (e.g., wireless or WiFi signal) targeted to the gateway. A measuring device may sense, over the premise's common radio channel, that the thermostat 152 just sent a packet to the gateway 108. The measuring device may also be configured to measure the signal strength (e.g., the power, or the received signal strength indicator (RSSI)) of that radio signal as it reaches the measuring device's antenna. The measuring device may measure signal strength using any signal-strength-measuring technique.

Figure 2:
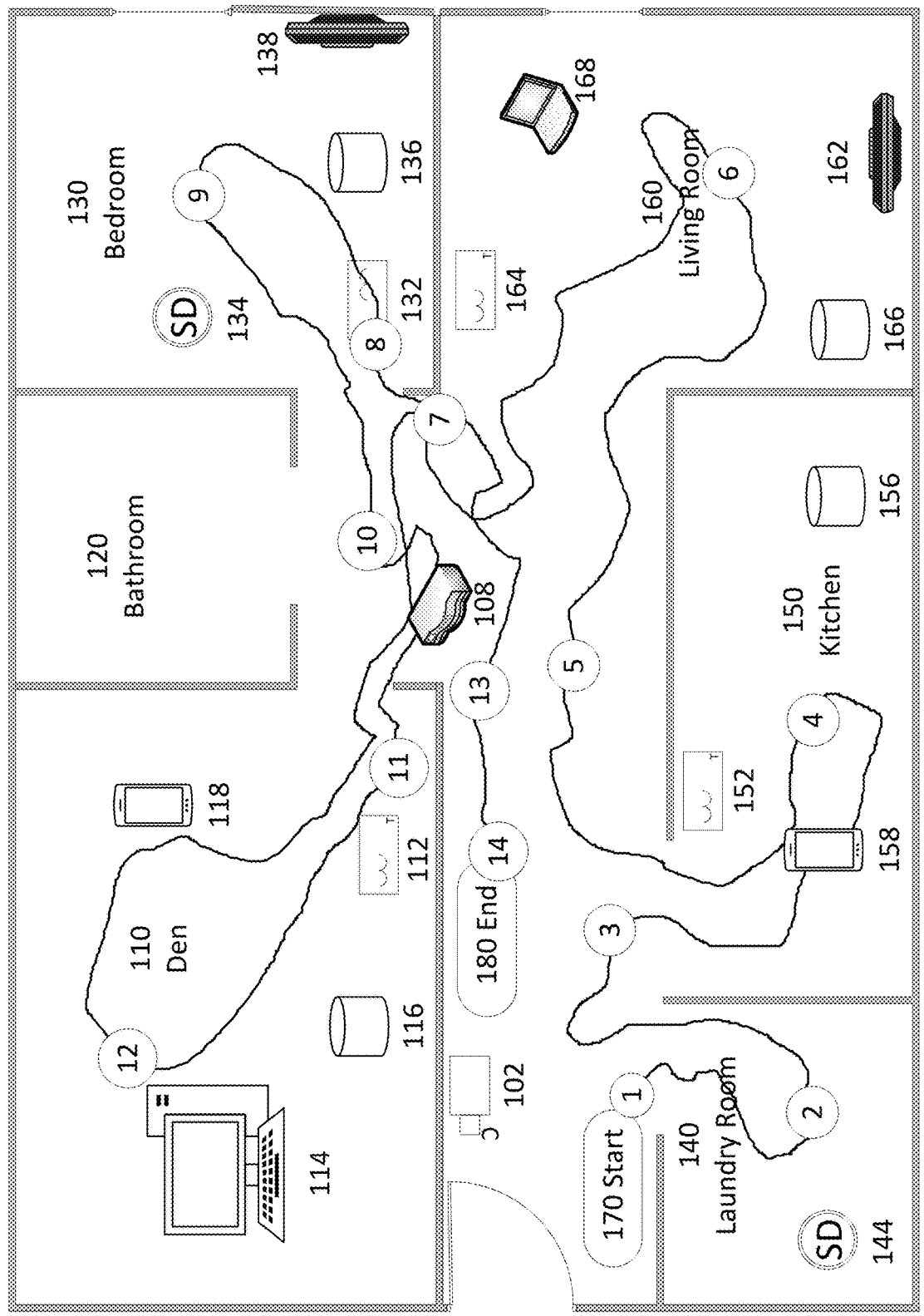
FIG. 2 shows an example premises network with anchor points.

FIG. 2 shows an example network in the premises 100 shown in FIG. 1, as well as showing graphically an example method for measuring signal strength. A measuring device as described above may be walked through the premises 100. Such walk through may be in a straight line or in straight lines or, alternatively or in addition, may be in a snaking or meandering path, as shown in FIG. 2. The measuring device may be walked through slowly and its path may comprise measurement (or "anchor") points. FIG. 2 shows, for example purposes, fourteen anchor points numbered in circles 1 through 14, where measurements may be taken of signal strengths of the various devices shown in the example premises 100. Software or an application running on such a measuring device may, in this way, take signal-strength "snapshots" at many locations along the path. At each point along the path the measuring device may record signal strength from multiple premises devices, and may record signal strength of signals from all devices, including the gateway 108. This may help distinguish which devices are closer to this (unknown) point (circles 1-14 where measurements are taken) and which are farther. Of course, different measuring devices may be used to measure signal strength at, for example, circles 1-14 where measurements are taken.

When capturing a signal or packet, the measuring device may capture a signal or packet and may record the name, MAC address, or other identifier of the device that sent the signal or packet as well as a signal strength (e.g., the power of the radio signal when received at the measuring device's antenna). Other information from the signal or packet may or may not be recorded. For example, there may be no reason to review, read, maintain, store or otherwise use any content of the received signal or packet, which may avoid any privacy concerns. The strength of the signal may be measured if the signal or packet is encrypted.

A gateway, such as the gateway 108, may be configured to communicate with devices on the network shown for example purposes within the premises 100 and may further be configured to communicate with other devices or networks (such as, for example, devices or servers on the Internet) outside of the premises 100. The gateway 108 may operate on more than one radio channel. For example, the gateway 108 may serve two channels such as one at a 5 GHz frequency band and another around a 2.4 GHz frequency band. Each device within the premises 100 may be configured to communicate on one of these channels. Therefore, to capture all the premises' devices, the measuring device may need to jump between the various channels or frequency bands used or serviced by the gateway in order to catch signals sent on them.

Some devices within a premises such as the premises 100 may be idle and not using the network (the wireless or WiFi network, for example) at all times. The measuring device may need to "wake" such devices by, for example, by pinging them (at their IP address, for example, which may be known to the network's management system, the gateway 108, or some other device). The measuring device may send a ping request to the "sleeping" devices or to all devices in the premises 100 in parallel to sniffing for signals, wireless packets or WiFi packets from the devices. Such ping request may cause the devices to reply and send a signal through the radio. If a device replies to the ping request, the signal or packet may be addressed to the pinging entity and/or may be addressed to gateway 108. The measuring device may not catch or receive only a signal or packet that is addressed to it but rather may catch or receive a signal that sent by each device regardless of the intended recipient.

The measuring device may not send the ping request. Such a request may be sent by another device, such as another device in the network of the premises 100. The gateway 108, for example, may send a ping request to the devices on the network of the premises 100 in coordination with the measuring device or otherwise.

The strengths of signals may be measured at the anchor points (the circles labeled 1 through 14 in FIG. 2, for example), the locations of which may be unknown to the measuring device at the time of measuring. A user of the network of the premises 100 (e.g., the user walking around with the measuring device) may take measurements along the path without stopping to record, for example, any coordinates associated with the anchor points 1 through 14).

Alternatively, or in addition, the user may record or provide signal-strength measurements from "known locations", meaning, the user would use the measuring device in a known location inside their home and manually provide a label for it (e.g. "center of kitchen", "doorway to Bob's room"). Later on they can provide coordinates for these points, and these known locations will help provide more accurate results for locating the home devices. Similarly, the user may take a long snake path, but manually mark the starting point and end point of the path.

Of course, if the premises comprises multiple floors, the measuring path may extend on each floor of the premises. Alternatively or additionally, the measurement procedure may be broken to multiple sessions and/or multiple floors. The user of the measuring device or the software or application on the measuring device may sense different floors during the walking-around process or a user may manually mark which floor the measuring device is on during the measuring process.

The measuring device may use additional helping tools, like computer-vision or motion-sensor-based software to map the structure of the premises (walls, doors, windows, doorways, etc.) or to automatically recognize the measuring-device's current location at any moment in the path. This may make it easier to locate or determine the location or relative location of the devices such as the devices shown in the premises 100.

FIG. 3 shows example information that may be measured by the measuring device. FIG. 3 shows a spreadsheet or array view of such information for explanation purposes only. The information may be stored as a spreadsheet or array or in any other manner. The information may be stored for each of the anchor points 1 through 14 shown for example purposes in FIG. 3. For example, anchor point 1 shown in FIG. 2 as being just outside the laundry room 140 and labeled as "start 170" may coincide with "anchor 1" shown in the example array of FIG. 3. During the measuring phase, the measuring device may measure the signal strengths of signals from one, more, or all of the devices communicating on a network at the premises 100 and, more specifically, at anchor point 1. The measuring device may store the strength of a signal received from, for example, camera 102. Such signal strength may be the RSSI of a signal sent by the camera 102. Additionally, the measuring device may store the RSSI of the signal sent by the camera 102 and also store the MAC ID for the camera 102 to correlate the signal strength with the device sending the signal associated with the signal strength. Alternatively, or in addition, the measuring device may measure the strength of the signal (e.g., measure the RSSI of the signal) and may send that measured strength along with the MAC ID associated with the signal (in this example, the measured strength of a signal sent by the camera 102 along with the MAC ID (or any other identifier) associated with the camera 102) to another device for storage and further analysis. Such other device may be any device and may be located at the premises 100 or located outside of the premises such as on a network (e.g., the Internet) that is in communication, whether directly or indirectly, with the gateway 108. Such other device may be the gateway 108 itself.

The measuring device at anchor point 1 may record signal strengths and associated MAC IDs with other devices within the premises 100, such as the smoke detector 144 located in the laundry room 140, the thermostat 152 located in the kitchen 150, the user device 156 located in the kitchen 150, the television 162 located in the living room 160, the television 138 located in the bedroom 130, the user device 136 located in the bedroom, the computer 114 located in the den 110 or the gateway 108. The measuring device may measure the signal strength of the other devices (or of all other devices) in the premises 100 at an anchor point. The measuring device may store this information along with an identifier of the source of each measured signal (such as MAC ID, IP address, or any other identifier). Alternatively or additionally, the measuring device may send this signal-strength and identifier information to another device within and/or outside the premises 100.

The measuring device may be moved along any path such as the path shown in FIG. 2 to anchor point 2. At anchor point 2, the measuring device may again measure the strength of signals sent by some or all of the devices in the premises 100. It may store such information and/or send this information to another device within the premises 100 and/or outside the premises 100.

The measuring device may be moved in straight or snake-like fashion through the premises to other anchor points such as locations 3 through 14 shown in FIG. 2, where signal strengths or RSSIs from one, some, or all of the devices in the premises 100 may be measured and stored in association with respective MAC IDs or other identifiers. Of course, more anchor points may be used than shown in FIG. 2, and such anchor points and measurements may be made on some or all other floors of a premises, in a garage, storage area, barn, shed, etc. associated with a premises network. For example, such measurements may be made with respect to any device communicating with a premises's network such as a wireless or WiFi network whether such devices are internal or external to the network.

The location of the anchor points 1 through 14 shown in FIG. 2 may be unknown to the measuring device and/or any other device, computer, server (whether within the premises 100 or elsewhere). Such unknown anchor-point locations may be determined or estimated. Such locations may be absolute locations (e.g., latitude and longitude values) or may be relative locations based on some origin point. For example locations of anchor points 1 through 14 may be unknown but may be determined or estimated relative to some chosen location. Such chosen location may be, for example, the location of the gateway 108. Alternatively, or in addition, such chosen location from which to determine or estimate the relative location of other devices in the premises 100 may be the location of any other device within the premises 100 or some other chosen location. For example, if the location of the gateway 108 is chosen as the reference point from which to determine or estimate the location of the other devices in the premises 108, the gateway may be assigned a coordinate in the X, Y and Z plane of 0, 0, 0. The relative location of each of the devices in the premises 100 may be determined relative to the 0, 0, 0 origin location of the gateway 108. For example, the relative location of the camera 102 may be determined to be minus ten feet away in an X direction, minus one feet away in a Y direction, and three feet away in a Z direction from the gateway 108, or at a coordinate of −10, −1, 3 relative to the location of the gateway 108. Alternatively, or in addition, the location of the devices may be based on two-dimensional parameters. For example, the location of the gateway may be at coordinate position 0, 0, and the location of the camera 102 estimated to be with two coordinates instead of three (such as X and Y) and the location in the Z direction may not be determined or estimated. Thus the camera 102 may be estimated to be minus ten feet away in an X direction, minus one feet away in a Y direction, or at a coordinate of −10, −1. Of course, if all three (X, Y, and Z) values are not used but instead only two values are used, any two values may be used in any combination desired.

In a similar manner to determining or estimating relative locations of devices in a premises relative to a location of origin, such as gateway 108, the locations of anchor points 1 through 14 relative to the location of the origin may be determined or estimated if such location is not already known or estimated. For example, a user may start taking measurements of signal strengths as described using the measuring device (or other device receiving signal-strength measurement data along with respective identifier data such as MAC IDs). The anchor point locations 1 through 14 may not be known or estimated. Thus, these locations (like the locations of the devices) may be determined or estimated to help in the mapping process. Such determined or estimated locations may be absolute locations (e.g., latitude and longitude). The determined or estimated locations may be relative locations based on, for example, an origin point of 0, 0, 0 somewhere in the premises 100, such as at the gateway 108, at any other device in the premises 100, at any anchor point 1 through 14, or at any other chosen location. For example, the relative location of the anchor point 1 may be determined to be minus eleven feet away in an X direction, minus four feet away in a Y direction, and 1 feet away in a Z direction from the gateway 108, or at a coordinate of −11, −4, 1 relative to the location of the gateway 108. Alternatively, or in addition, the location of the anchor points may be based on two-dimensional parameters. For example, the location of the gateway may be at coordinate position 0, 0, and the location of the anchor point 1 may be estimated with two coordinate values (such as X and Y) and the location in the Z direction may not be determined or estimated. Thus anchor point 1 may be minus eleven feet away in an X direction and minus four feet away in a Y direction, or at a coordinate of −11, −4. If all three (X, Y, and Z) values are not used but instead only two values are used, any two values may be used in any combination desired.

Locations of anchor points and devices in the premises 100 that are unknown may be determined or estimated iteratively. A radio signal may lose its power as it is propagated through space. A primary factor in determining or estimating an absolute or relative location of a device or of an anchor point may be that, all other things being equal, a stronger signal is received from a device that is closer to an antenna than a weaker signal, which may be received from a device located at a further distance from the receiving antenna. Measuring from multiple anchor points in the premises (such as anchor points 1 through 14 shown in FIG. 2) may aid in determining or estimating a location of a device and a location of an anchor point from where signal-strength measurements may be taken.

For each device and anchor point, unknown variables (the ones being estimated or determined) may be its respective coordinates, such as in X, Y, and Z planes or directions, that is, in an arbitrary axes system of the premises 100. As noted, the Z dimension may represent the height of a device or anchor point (from the floor to ceiling), and the end result visualization may disregard it and render a simple two-dimensional map, floorplan or other visual depiction on generated.

The measuring device may measure power of a received signal (in mW—milliWatts) and may be represented as Received Signal Strength Index (RSSI) in the logarithmic Deci-Bell scale, e.g. $10*\log\_10(0.00001 \text{ mW})=-50 \text{ dBmW}$. Additionally, an assumption may be made regarding the physical model of power decay: the signal power may be assumed to decay by a power of distance. Any assumed distance may be calculated in, for example, meters d as $d=10^{\{[Tdb-Rdb]/(10*n)\}}$, where Tdb may represent an RSSI at one meter away from a device sending the signal being measured, Rdb may represent an RSSI that is measured at distance d meters, and where n may be a propagation constant (typically between 2 and 4). To simplify, an assumption may be made that all devices in the premises may transmit in the same power, having RSSI of −50 dBmW at a distance of 1 meter. Then for each measurement, RSSI Rdb may be measured and an uncalibrated distance of $d=10^{\{[-50-Rdb]/(10*n)\}}$ may be calculated.

It may be, however, that not all devices in the premises 100 transmit with the same power. For example, the gateway 108 may transmit with stronger energy then other devices. To account for these differences, another unknown variable may be estimated or attached to each device—a distance gain—which may be a multiplier over uncalibrated distance calculation d. Each device may be assigned or estimated to have its own distance gain g. The distance gain g may be assumed to be a constant for a single device, which may of course be a simplifying assumption because a radio signal may weaken at different scales in different rooms of the premises 100.

If anchor points such as anchor points 1-14 shown in FIG. 2 are unknown at the time of measuring signal strength of devices at premises 100, an iterative alternating method may be implemented to determine or estimate the absolute or relative location of the anchor points 1-14 and also the absolute or relative location of each of the devices in the premises 100. The method may commence with initialization that assigns arbitrary locations for the anchor points 1-14 (such as guesses of those locations along a path like that showed in FIG. 2). The method may iterate over two or potentially three steps. For example, first, an estimate may be performed as to each device's location and gain based on currently-assumed anchor points. Second, an estimate may be performed as to each anchor point based on currently-assumed device locations and gains. Third, optionally, current assumed locations of both or either devices and anchors may be normalized.

After several iterations, the method may end (e.g. after pre-determined number of iterations or after some other criterion is met). The result may be an estimated or determined location of the devices in the premises 100. The devices may then be visually presented as points on a two-dimensional or three-dimensional plot, map or other visualization of the premises 100 or individual, or all, floors of a premises.

Figure 4:
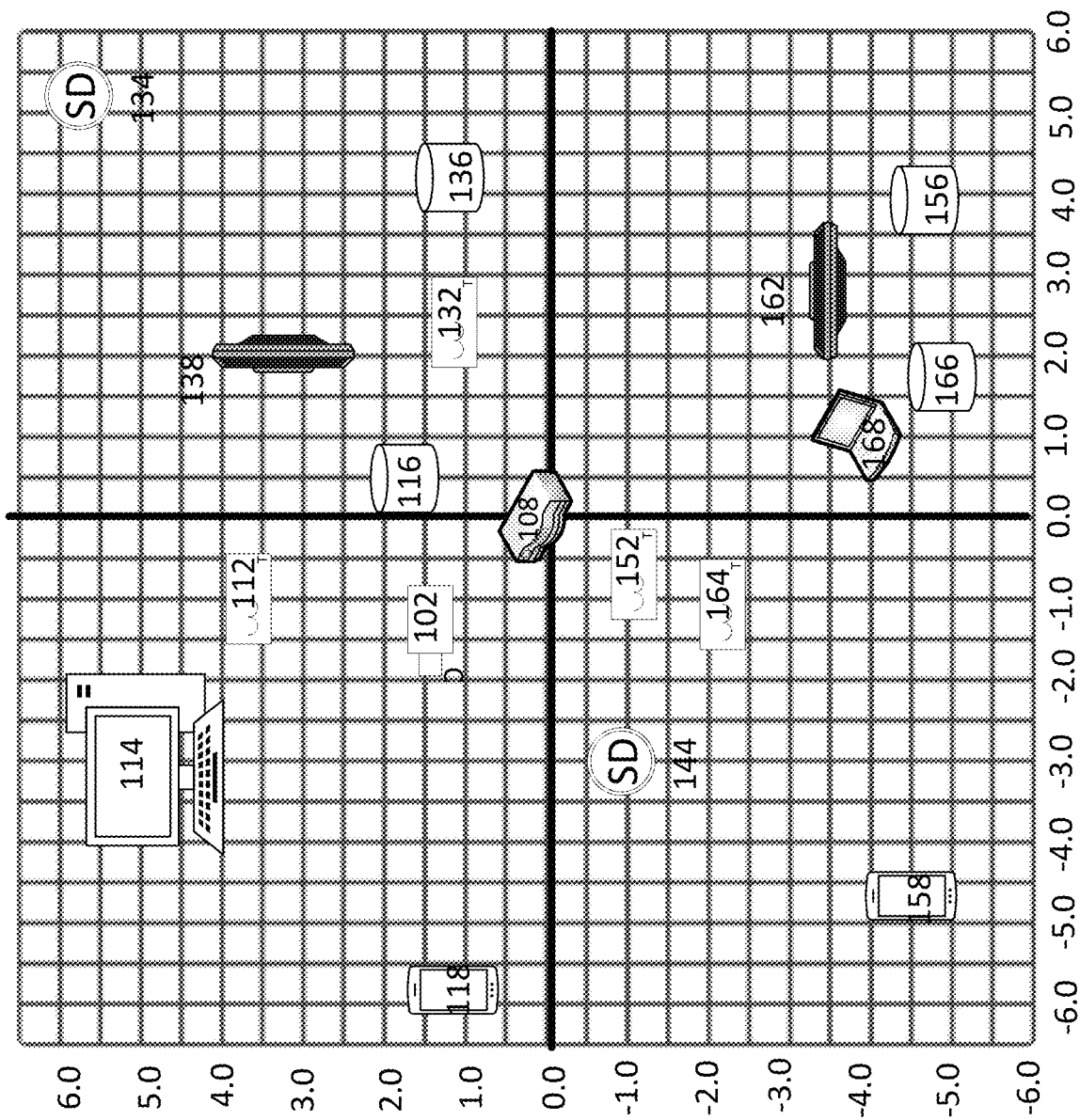
FIG. 4 shows an example of relative locations of devices in a premises.

FIG. 4 shows an example result of a first iteration of the method. As shown, in this example, the gateway 108 is shown in a coordinate system comprising a horizontal (e.g., "x") axis and a vertical (e.g., "y") axis with the gateway 108 at the intersection of these axes. Thus, in one example measuring method, the gateway 108 may be considered to be at location 0, 0 in this example coordinate system. In a first iteration of the method, a measuring device may measure signal strengths of signals sent by the devices in the premises 100, all shown in FIG. 4, at one or more of the anchor points 1 to 14 shown in FIG. 2. The method may be implemented based on those signal strengths associated with each of the devices and determine, in this example, a relative location of each of the devices with respect to the 0, 0 location of the gateway. A comparison of the relative locations shown in FIG. 4 with the actual locations of the devices as shown in FIGS. 1 and 2 demonstrates that, in the first iteration, the estimation or determination of locations does not match actual relative location. For example, thermostat 152 actually is further away from the gateway 108 than as shown in FIG. 4 after a first iteration of the algorithm. As another example, the television 162 is shown in FIG. 4 as being closer to the laptop computer 168 than actually shown in FIGS. 1 and 2. In fact, in FIG. 4, all devices may be estimated or determined to be in different locations relative to one another, relative to the gateway, and relative to absolute (e.g., latitude and longitude) location than shown in FIGS. 1 and 2 as to their actual location.

Figure 5:
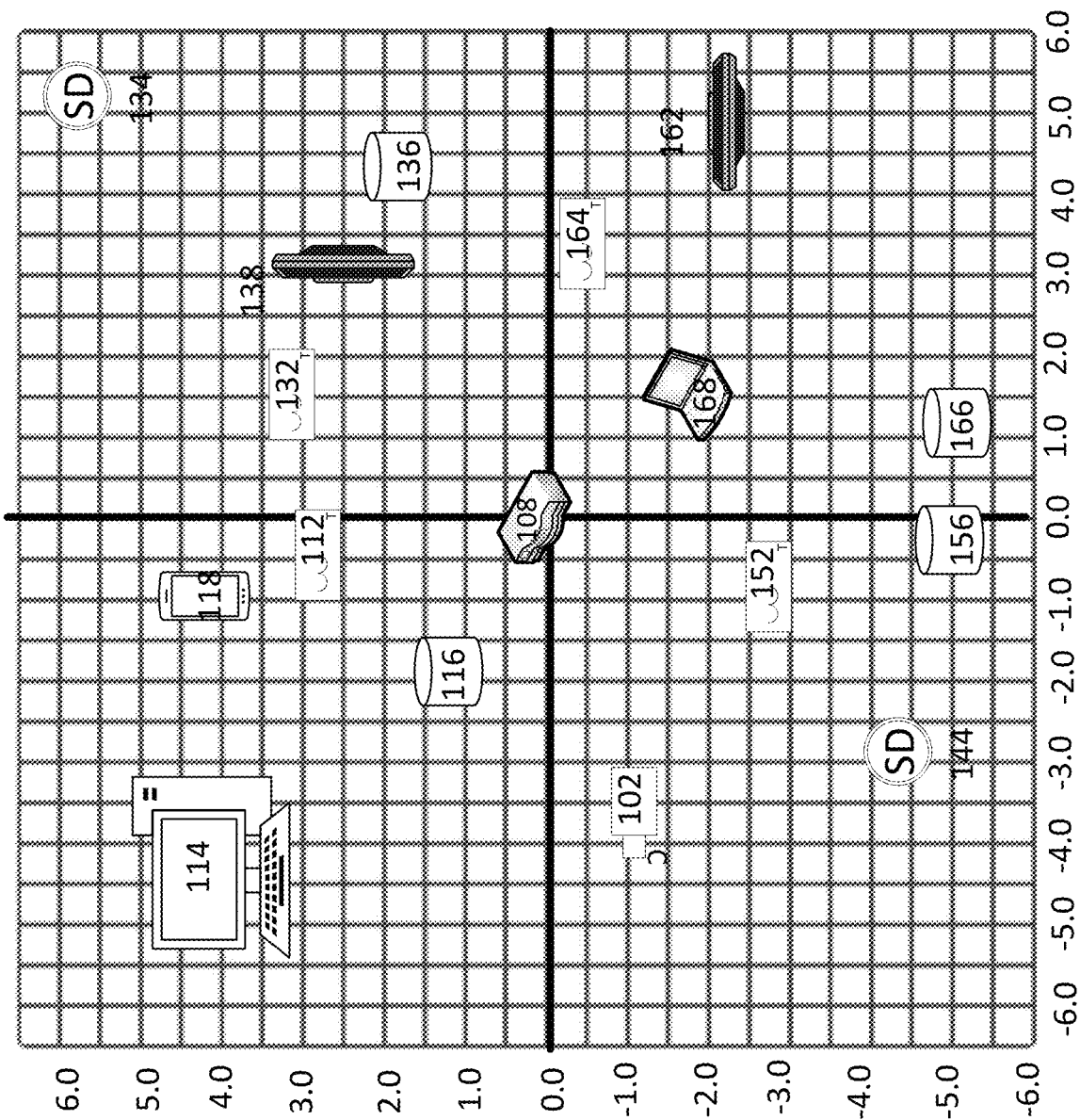
FIG. 5 shows an example of relative locations of devices in a premises.

FIG. 5 shows an example result of an example second iteration of the method. As shown, in this example, the gateway 108 is shown in a coordinate system comprising a horizontal (e.g., "x") axis and a vertical (e.g., "y") axis with the gateway 108 at the intersection of these axes. Thus, in one example measuring method, the gateway 108 may be considered to be at location 0, 0 in this example coordinate system. In a second iteration of the method, a measuring device may measure signal strengths of signals sent by the devices in the premises 100, all shown in FIG. 5, at one or more of the anchor points 1 to 14 shown in FIG. 2. Alternatively or additionally, the second iteration of the algorithm may be performed using different anchor points, which may occur as the measuring device is moved around the premises 100. For example, if the algorithm is being run at real-time, while the user is walking with the measuring device, the X iteration may be using more anchor points than iteration [X−1]: all the anchor points collected so far during the walking path. The earlier anchor points may already have good location-estimations (estimated in the previous iterations), and the newly-collected anchor points' locations may be guessed with random initializations. Then the method may be implemented based on those signal strengths associated with each of the devices and determine, in this example, a relative location of each of the devices with respect to the 0, 0 location of the gateway. A comparison of the relative locations shown in FIG. 5 with the actual locations of the devices as shown in FIGS. 1 and 2 demonstrates that, in the second iteration, the estimation or determination of locations does not a match actual relative location but is closer to actual relative location than each was as a result of the first iteration of the method, as shown in FIG. 4. For example, thermostat 152 is shown in FIG. 5 as being further away from the gateway 108 than as shown in FIG. 4 after a first iteration of the algorithm and more consistent with the thermostat's 152 actual location shown in FIGS. 1 and 2. As another example, the television 162 is shown in FIG. 4 as being further away from the laptop computer 168 than actually shown in FIGS. 1 and 2 and shown in FIG. 4 as a result of the first iteration. But the television 168 has now moved in the Y direction to be closer to the gateway 108 than it was shown in FIG. 4, which is further away from its actual position as shown in FIGS. 1 and 2. In fact, in FIG. 4, all devices may be estimated or determined to be in different locations relative to one another, relative to the gateway, and relative to absolute (e.g., latitude and longitude) location than shown in FIGS. 1 and 2 as to their actual location. But on the whole, the devices may be shown to be in locations in FIG. 5 as a result of the second iteration of the method closer to their actual locations of FIGS. 1 and 2 than they were as a result of the first iteration as shown in FIG. 4.

Figure 6:
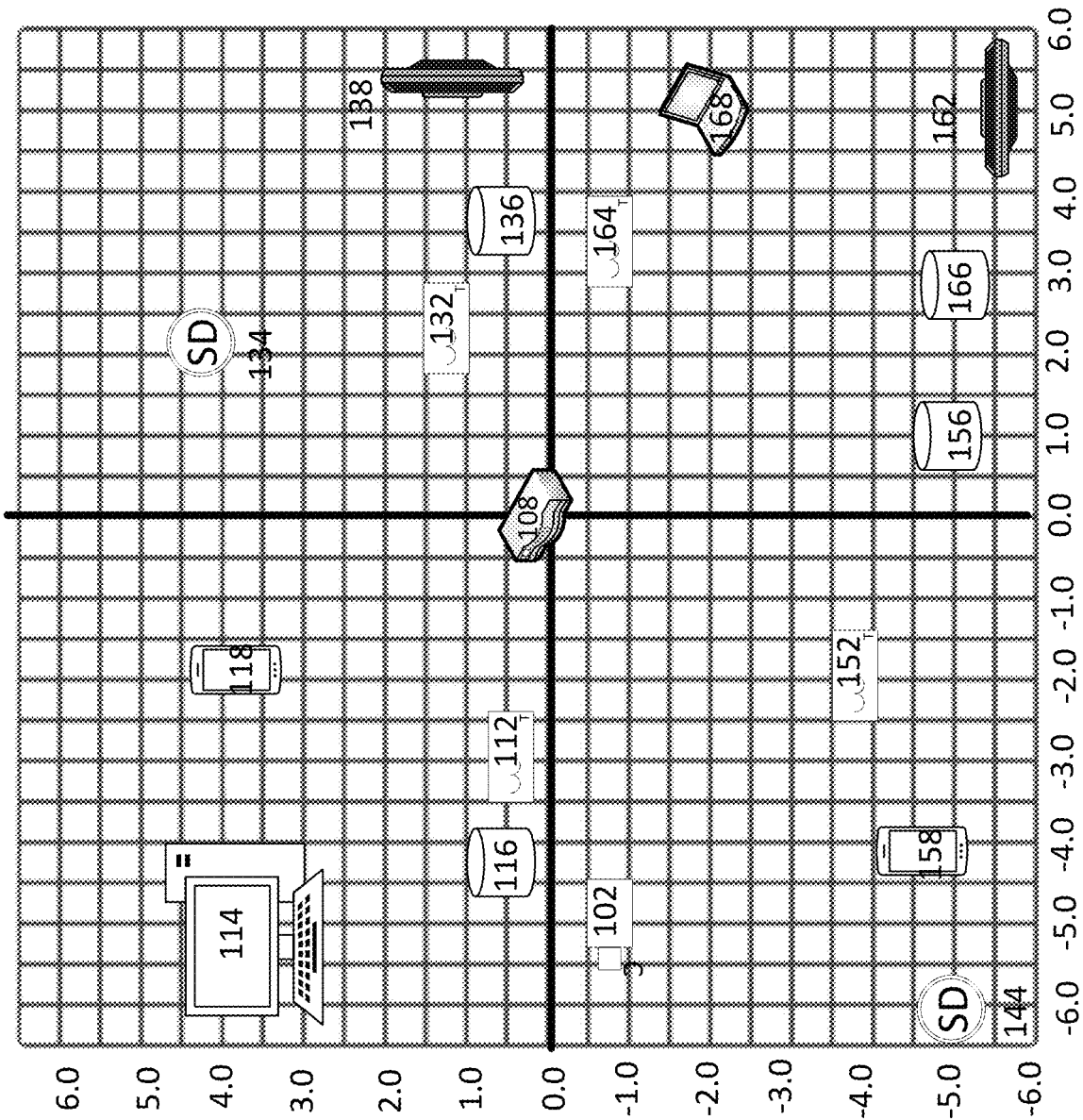
FIG. 6 shows an example of relative locations of devices in a premises.

FIG. 6 shows an example result of an example third iteration of the method. The result shown in FIG. 6 may be after two iterations. Alternatively, the result of FIG. 6 may be the result of more iterations. The method may be iterated any number of times to further refine the location estimates.

As shown, in this example, the gateway 108 again is shown in a coordinate system comprising a horizontal (e.g., "x") axis and a vertical (e.g., "y") axis with the gateway 108 at the intersection of these axes. Thus, in one example measuring method, the gateway 108 may be considered to be at location 0, 0 in this example coordinate system. In a third iteration of the method, a measuring device may measure signal strengths of signals sent by the devices in the premises 100, all shown in FIG. 6, at one or more of the anchor points 1 to 14 shown in FIG. 2. Alternatively or additionally, the third iteration of the algorithm may be performed using different anchor points, which may occur as the measuring device is moved around the premises 100. Then the method may be implemented based on those signal strengths associated with each of the devices and determine, in this example, a relative location of each of the devices with respect to the 0, 0 location of the gateway. A comparison of the relative locations shown in FIG. 6 with the actual locations of the devices as shown in FIGS. 1 and 2 demonstrates that, in the third iteration, the estimation or determination of locations more closely matches actual relative location than the results shown in FIGS. 4 and 5. For example, thermostat 152 is shown in FIG. 6 as in a location more consistent with its actual location shown in FIGS. 1 and 2 in comparison to other devices, to the gateway 108, and to actual positioning. As another example, the television 162 is shown in FIG. 6 as being in a location more consistent with its actual location shown in FIGS. 1 and 2 in comparison to other devices, to the gateway 108, and to actual positioning. In fact, in FIG. 5, all devices may be estimated or determined to be in about their actual locations as a result of the third iteration of the method. Of course, it may be that more iterations would be helpful in determining or estimating actual locations of the devices in the premises and actual locations of anchor points, which is used to determine locations of the devices.

An example method for estimating a location of a device such as any of the devices shown in FIGS. 1 and 2, may be as follows:

Input:
- - -
A: Two-dimensional array (N,2), which may be the assumed positions of N anchor points.
d: One dimensional array (N), which may be the uncalibrated distances from a device to each anchor point (distance divided by the device's unknown gain)

Output:
- - -
p: One-dimensional array (2), which may be an estimated two-dimensional position coordinates of the device
g: scalar, which may be an estimated distance-gain for the device.

Observations may define a system of N quadratic equations (i=0, 1, 2, . . . N−1. N may be more than three): $\|A\_i-p\|\_2^2 = g^2 * d\_i^2$ or $\|A\_i\|\_2^2 + \|p\|\_2^2 - 2 - 2 < A\_i, p > = g^2 * d\_i^2$, where p is a device's unknown position or location, A_i is an assumed location of the i'th anchor points (A_i may be known, or assumed, based on random initialization or estimations from previous iterations), d_i may be an uncalibrated distance (calculated from the RSSI measurement between the device and anchor point A_i), and where g may be gain for a device that is also unknown ($g^2$ is the square of the unknown gain, which can be seen as a gain for the squared-distances of the device from the anchors).

By subtracting equations i=1 . . . (N−1) from equation 0, a system of (N−1) linear equations may be: $\|A\_0\|\_2^2 - \|A\_i\|\_2^2 = 2 * < A\_0 - A\_i, p > + (d\_0^2 - d\_i^2) * g^2$ Or, in matrix form:

b=W*p, where b may be a column vector of N−1, p may be a column vector of three (two unknown coordinates and unknown gain), W may be a matrix of (N−1, 3) where: for i=1 . . . (N−1):
b_i=$\|A\_0\|\_2^2 - \|A\_i\|\_2^2$
for i=1 . . . (N−1) (each row of W):
W_i=$[2(A\_0 - A\_i), d\_0^2 - d\_i^2]$ Solving may be treated as an optimization problem (to handle noisy measurements), using least squared errors.

```
def order_anchors_by_distance(A,dists):
    order = [pair[0] for pair in sorted(enumerate(dists),key=lambda x:x[1])]
    A_new = A[order,:]
    dists_new = dists[order]
    return (A_new,dists_new)
def estimate_device_location_and_gain(A, dists,xlim=None,ylim=None):
#A: (N,dim) matrix of assumed dim-dimensional positions of N anchor points
#dists: (N) array of N (uncalibrated) distances of the device from the N anchor points
    if xlim is None:
        xlim = [-np.Inf,np.Inf]
    if ylim is None:
        ylim = [-np.Inf,np.Inf]
    (N,dim) = A. shape
    if dim == 3:
        zlim = [0,4]
    #Order the anchors and distances by increasing order of distance (from closer to farther):
    (A, dists) = order_anchors_by_distance(A, dists)
    sq_norms = np.sum(A**2,axis=1) #||A_i||_2^2
    sq_dists = dists **2 # d_^2
    anchor_diffs =A[:1,:]-A[1:,:]
    sq_norm_diffs = sq_norms[0] - sq_norms[1:]
    sq_dists_diffs = sq_dists[0] - sq_dists [1:]
    b =np.array(sq_norm_diffs)
    W = np.concatenate((2*anchor_diffs, np.expand_dims(sq_dists_diffs,1)),axis=1)
    if dim == 3:
        x_low = np.array([xlim[0], ylim[0], zlim[0], 0])
        x_high = np.array([xlim[1], ylim[1], zlim[1], np.Inf])
```

```
else:
    x_low = np.array([xlim[0], ylim[0], 0])
    x_high = np.array([xlim[1], ylim[1], np.Inf])
res = scipy.optimize.lsq_linear(W,b,bounds=(x_low,x_high))
#print(res)
est_pg = res.x # The optimization solution: the estimated position and squared-
gain of the device
    est_p = est_pg[:-1]
    est_g = est_pg[-1]**0.5
    return (est_p,est_g)
```

If the locations of anchor points (from which signal-strength measurements may be taken) are known or estimated or entered by a user, then the method may be used once to estimate or determine a location of a device or to map device locations throughout the premises. For example, at the time of moving a signal-strength measurement device along a path through a premises, such as the paths shown in FIG. 2, a user may note where each anchor point is. Alternatively, or in addition, a user may enter such information regarding a location of each anchor point later. FIG. 7 shows a depiction of such labels provided by a user for each anchor point. For example, for anchor point 1 shown in FIG. 2, at the time of measuring signal strengths at that location, or at some time later on, a user may add a label for that anchor point, namely, "entry to laundry room." Similarly, as the user takes signal-strength measurements at anchor point 2 shown in FIG. 2, a user may label the location as "middle of laundry room" either when the measurement is taken or at some later time. This process may be continued for all anchor points, such as all 14 anchor points shown in FIG. 2.

A user may provide coordinates either in one, two, or three dimensional space for each of the anchor points. Such coordinates may be, for example, absolute coordinates such as latitude and longitude. Such coordinates may be relative to some chosen origin, such as a location of the gateway 108 or any other location in the premises. In addition to the place of the origin, the user may decide on the directions of the axes. A choice may be to have the X and Y axes parallel to walls in the premises, for example, for the floor plan in FIG. 1, the user may decide that the origin may be the location of the gateway and the negative direction of the X axis may go from the gateway towards the door (the positive direction of the X axis may go from the gateway away from the door) and that the positive direction of Y axis may go from the gateway towards the bathroom 120. For example, a user may measure or estimate a distance (whether in feet, meters, or other unit of measure) in the X, Y and/or Z directions of each anchor point and record that information along with (or in lieu of) anchor-location labels, as shown in FIG. 7.

If the path with measurement (anchor) locations is longer than, for example, the path shown in FIG. 2 and/or comprises more measurement (anchor) locations, iterations may aid in more accurately determining the location or relative location of devices. Overall, it may be desirable to determine or estimate a device's location vector p=[x;y;z] as well as the device's gain g. Thus as described the input for each of known path points (for i in 0 . . . N), a location may be: a_i=[x_i;y_i;z_i] and the (uncalibrated) distance d_i between the measurement point and the device.

An example method for estimating a location of a measurement or anchor point such as, for example, anchor points 1 through 14 shown in FIG. 2, may be as follows. If locations or a map of the home devices has already been determined or estimated, the method may be used once to estimated anchor points. If the location of the devices has not been estimated, then the following may be part of an iterative algorithm.

```
Input:
P: 2d array (M,2). The (currently assumed) device positions of M devices.
g: 1d array (M). The (currently assumed) distance-gains of the M devices.
d: 1d array (M). The (uncalibrated) distances from the M devices to the anchor.
Output:
a: 1d array (2). The estimated 2d position coordinates of the anchor.
The observations define a system of M quadratic equations (j=0,1,...M-1; we need M >
2):
    ||a - P_j||_2^2 = g_j^2*d_j^2
    (or):
    ||a||^2 + ||P_j||_2^2 - 2<a,P_j> = g_j^2*d_j^2
By subtracting equations j=1. . .(M-1) from equation 0, we get a system of (M-1) linear
equations:
    ||P_0||_2^2 - ||_2^2 - (g_0^2*d_0^2 - g_j^2*d_j^2) = 2*<a, P_0 - P_j>
Or, in matrix form:
b = W*a
b is column vector of M-1
    a is column vector of 2 (2 unknown coordinates)
W is matrix of (M-1, 2)
where:
for j=1. . . (M-1):
b_j = ||P_0||_2^2 - ||P_j||_2^2 - (g_0^2*d_0^ 2 - g_j^2*d_j^2)
for j=1. . . (M-1) (each row of W):
W_j = [2(P_0 - P_j)]
```

The method may be treated as an optimization problem (to handle noisy measurements), using least squared errors, as follows:

```
def estimate_anchor_location(P,dists,gains,xlim=None,ylim=None):
#P (M,dim): the currently assumed dim-dimensional positions of M devices
#dists (M): the uncalibrated distances from the M devices to the anchor point
#gains (M): the (currently assumed) distance-gains for the M devices
    if xlim is None:
        xlim = [-np.Inf,np.Inf]
    if ylim is None:
        ylim = [-np.Inf,np.Inf]
    (M,dim) = P. shape
    if dim == 3:
        zlim = [0,4]
#Calibrate each distance measurement with the estimated gain of the relevant device, to
produce calibrated distances:
dists = gains*dists #for j=0. . . M-1: g_j*d_j
    #Order the anchors and distances by increasing order of distance (from closer to
farther):
    (P,dists) = order anchors by distance(P,dists)
    sq_norms = np.sum(P**2,axis=1) # ||P_j||_2^2
    sq _dists = dists**2 #d_j^2
    device_diffs = P[:1,]-P[1:,:]
    sq_norm_diffs = sq_norms[0] - sq_norms[1:]
    sq_dist_diffs = sq_dists[0] - sq_dists[1:]
    b = np.array(sq _norm_diffs - sq_ dist_diffs)
    W = 2*device_diffs
    if dim == 3:
       x_low = np.array([xlim[0], ylim[0], zlim[0]])
       x_high = np.array([xlim[1], ylim[1], zlim[1]])
    else:
       x_low = np.array([xlim[0], ylim[0]])
       x_high = np.array([xlim[1], ylim[1]])
# #Apply weighting: give higher weight to evidence from close anchors (shorter
paths).
#weights = dists[1:]**(-2)
#b = b * weights
#W = W * np.expand_dims(weights,1)
    res = scipy.optimizelsq_linear(W,b,bounds=(x_low,x_high))
    #print(res)
    est_a = res.x
    return (est_a)
```

A goal is to find the location of an "anchor" (measurement point) a=[x;y;z]. The input is: for each known home device (for j in 0 . . . M), we have the device's location p_j=[x_j; y_j;z_j] and gain g_j, and the measured uncalibrated distance d j from the device j and the current anchor point.

This component's algorithm may be similar to finding a device location. One difference may be that an anchor point may not be associated with gain because a measuring device may be passively receiving radio signals and not transmitting.

To help prevent the algorithm from drifting, shrinking, or exploding the estimated locations (whether anchor points or device locations), a normalization step may be added at each iteration or at some, half, or most iterations. These normalizations may maintain the relative "shape" of the device and anchor points, but they may change scale or global positioning in the axes system. Normalization may comprise a vector shift and/or scaling. As for vector shift, a vector may be subtracted from all points, for example, to center all points around the origin, or to force the gateway to be placed in the origin. As for scaling, all, most, or some location vectors may be multiplied by a number to shrink or expand a spread of points to a reasonable, consistent size.

If some locations are known such as when a user specified a location at a start of the path (e.g., anchor point 1 as shown in FIG. 2), a normalization may be performed to help ensure that any currently-assumed location is consistent with the known locations (e.g. shift vectors, to help ensure that the path's start point is on the appropriate coordinates).

For every set of distance-measurements, there may be multiple maps that are consistent with the measurements. For every map result, other acceptable maps can be produced by: Translation (simply repositioning where the origin of axes should be); rotation (turning the whole map clockwise/counter-clockwise); scaling (changing the scale of x, y dimensions to fit actual size in meters/feet); and/or mirroring (flipping between "view from above" and "view from below").

Hard-coordinate decisions may be arbitrarily decided such as that the gateway (e.g., gateway 108 shown in FIGS. 1 and 2) may be located at an origin of axes [0,0,0]. A first anchor point may be placed at, for example, [0,1,1.5]

A user may view a produced map and adjust it according to preference, by applying translation, rotation, scaling and/or mirroring.

Alternatively or additionally, an algorithmic approach may be to model unknown variables (e.g. the <x,y,z> coordinates of the devices) and latent variables (e.g. gains and the <x,y,z> of the anchor points) in a big probabilistic approach. This may enable derivation of an expectation-maximization algorithm, which will aid in promoting a likelihood that may improve with every iteration (hence, guarantee convergence).

The method may be subject to additional constraints, such as requiring that consecutive anchors on the path may not be too far from each other.

Both aspects of the foregoing method (that is, determine or estimate device location and gain and determine or estimate anchor point) may reduce to a system of equations (evidence) that may be solved by finding an approximate solution (in least squares sense). However, not all evidence may be equivalent. For example, measurement of a strong signal may be a more reliable evidence of a close point in three-dimensional space, whereas a measurement of a weaker signal may be less reliable or less accurate (or more noisy) evidence of the expected distance in three-dimensional space. In this way, equations may be weighted to potentially provide more emphasis to the more reliable/accurate measurements. Furthermore, possible weight may be inverse to the assumed uncalibrated distances (or squared distances) involved in the equation. Equations about shorter distances will get more emphasis in the least squares optimization.

Noisiness of measurements of far devices may be addressed by modeling what causes that noise. For example, the obstacles, mainly the walls in the home, may be modeled. If the wall structure is known, it can be incorporated to correct the model. For example, a measurement of a weak signal may indicate that the signal traveled a long route to get to the measuring device's antenna, but it is possible that the device may be close in three-dimensional space, just hiding behind a wall, for example—making the signal travel a longer route around the wall. If the wall structure is not known, an inference may be made by the shape of the estimated path that the user followed when walking in the premises.

Devices may be named and/or profiles for devices may be created to aid a user in identifying devices by their location in the premises. Visualization of premises devices (including at least the stationary ones) on a home map may help a user manage the devices. A user may further be better able to monitor or visualize wireless network or WiFi telemetry in a spatial way (e.g. rooms/areas with weaker signal, rooms/areas with much download). The method further may aid in identifying for a user where booster devices (e.g., WiFi extenders) for the premises network may be placed to optimize use of such devices and maximize network coverage in the premises. Likewise, it may aid in placement of a network gateway.

The method may further aid in locating a lost device. For example, a laptop or tablet computer that is lost within the premises may be identified and located using the method. Also, the method may aid when troubleshooting the network by, for example, being used to infer where a user is in the premises or to detect movement in the premises for security or other purposes. Additionally, while balancing privacy concerns, the method may provide for collecting data for future evaluation such as premises dimensions, spatial distribution of devices or spatial distribution of activity, etc. Furthermore, if the measuring device (or the gateway) comprises an array of antennae, a direction from which a signal or packet is coming from may be inferred which may provide at least a hint of a path of radio transmissions through the air.

Mapping of devices in the premises may be completed in a hierarchical manner. One layer estimating partition of the home to clusters of devices in rooms and the location of the rooms in the premises, and a second layer estimating a finer mapping of devices in each room of the premises. Additionally, systems (computer-vision, lidar, acoustic-echolocation, etc.) may provide information about walls and shapes of each room of the premises. Alternatively or additionally, a user may have a floor plan of the premises that may be incorporated into a model and improve estimation of device location. Device names and/or device types may be leveraged as additional hints/constraints to map the premises. For example, kitchen appliances may be assumed to be close to each other.

Figure 8:
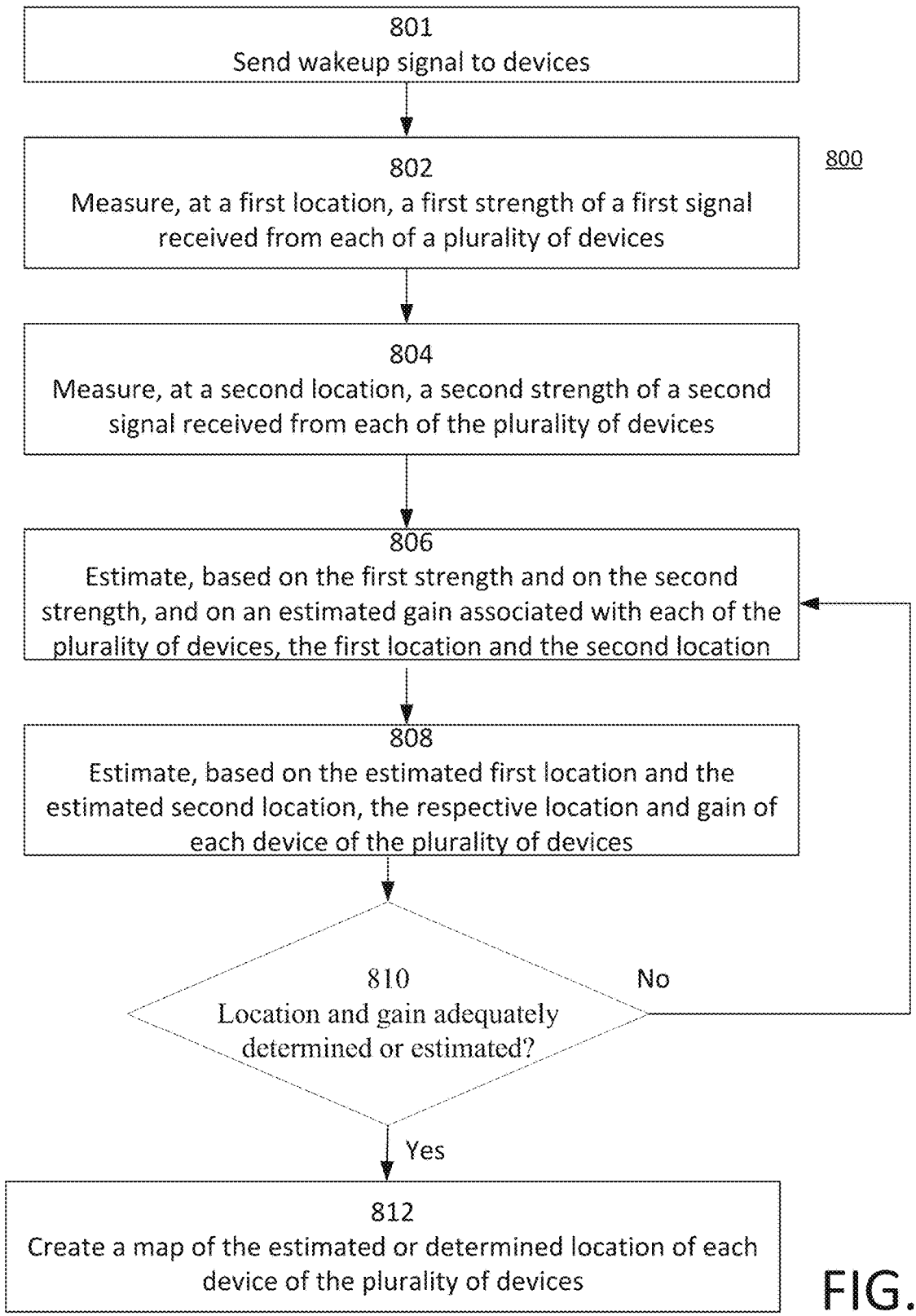
FIG. 8 shows an example method.

FIG. 8 shows an example method 800. The method 800 may be an iterative method and may be implemented when locations of anchor points (such as, for example, anchor points 1 through 14 shown in FIG. 2) are unknown. The method 800 may be an iterative method and may be implemented when locations of devices within a premises are unknown. The method 800 may be implemented in iterative fashion when locations of both anchor points and devices are unknown.

At step 801, a signal may be sent to devices in a premises to wake the devices up or to instigate the devices to send a signal. For example, one or more devices in a premises may be sleeping or otherwise inactive. Thus a wakeup signal may be sent to the devices so that the devices send a signal the strength of which may be measured. Such a wakeup signal may be sent by a measuring device—a device configured to measure signal strength—or by another device such as, for example, a gateway such as gateway 108 shown in FIG. 1. The devices may send a signal or signals. At step 802, the strength of the first signals sent by the devices may be measured at a first location, such as a location of the measuring device. At step 804, the strength of the second signals sent by the devices may be measured at a second location. For example, the measuring device may be moved to the second location. Using the first signal strengths and the second signal strengths, at step 806, an estimate may be made as to the first location and the second location. Such first and second locations may be anchor points such as two of the 14 anchor points shown in FIG. 2. Such first and second locations further may be estimated after signal strengths are measured at additional anchor points throughout a premises such as one or more of additional anchor points of the 14 anchor points shown in FIG. 2. Estimates of anchor-point locations may be made current to the process of measuring signal strengths at various anchor points. Estimates of anchor-point locations may be made subsequent to the process of measuring signal strengths at various anchor points or subsequent to the process of measuring signal strengths at all of the anchor points in a premises such as all 14 anchor points shown in FIG. 2. The estimate of the first and second locations may also be based on an estimated gain of each of the plurality of devices. This estimate may be performed by the measuring device, by another device within the premises (such as a gateway or any other device), or by a device outside the premises such as a device or server computer remote from the premises and in communication with the network of the premises through, for example, the Internet.

At step 808, an estimate of the location within the premises of each device of the plurality of devices, as well as the gain associated with each such device, may be made. Such an estimate may be based on the estimated first and second locations. At step 810, a determination may be made as to whether the location and gain of each device of the plurality of devices has been adequately determined or estimated. If not (or if the algorithm or method is implemented with a set number of iterations that have not yet been reached), then steps 806 and 808 may be repeated until the location and gain of each device of the plurality of devices has been adequately determined or estimated (or until the established number of iterations has been reached). At step 812, a map of the determined or estimated locations of the devices may be created. Such a map may show the location or relative location of each device of the plurality of devices with respect to one another. Such a map may show the location or relative location of each device on a map that is akin to a floor plan showing rooms and walls, etc.

FIG. 9 shows a method 900. The method 900 may be implemented to estimate or determine anchor point locations within a premises. At step 902, a first strength of a first signal sent by a first device may be measured. The first signal may be received, for example, by a measuring device. At step 904, a second strength of a second signal sent by a second device may be measured. At step 906, an estimate of the first location may be made based on the first strength of the first signal, the second strength of the second signal, as well as an estimated location of the first device that sent the first signal and the second device that sent the second signal. The first location and the second location may be estimated based on, for example, a determination or estimation of the location of the first and/or second devices that sent the first and second signals, respectively. The location of the first and second devices may already be mapped or otherwise known or estimated. At step 908, a user may enter a name or label for the first location and for the second location, as described with respect to FIG. 7. And at step 910, a user may enter a coordinate for the first location and the second location, such as an absolute location (e.g., latitude and longitude) or may, alternatively or additionally, provide a relative location of the first and second locations, such as a distance (e.g., meters or feet) from a gateway in X and Y coordinates, X and Z coordinates, Y and Z coordinates, or in X, Y and Z coordinates, as described with respect to, for example, FIG. 7.

Figure 10:
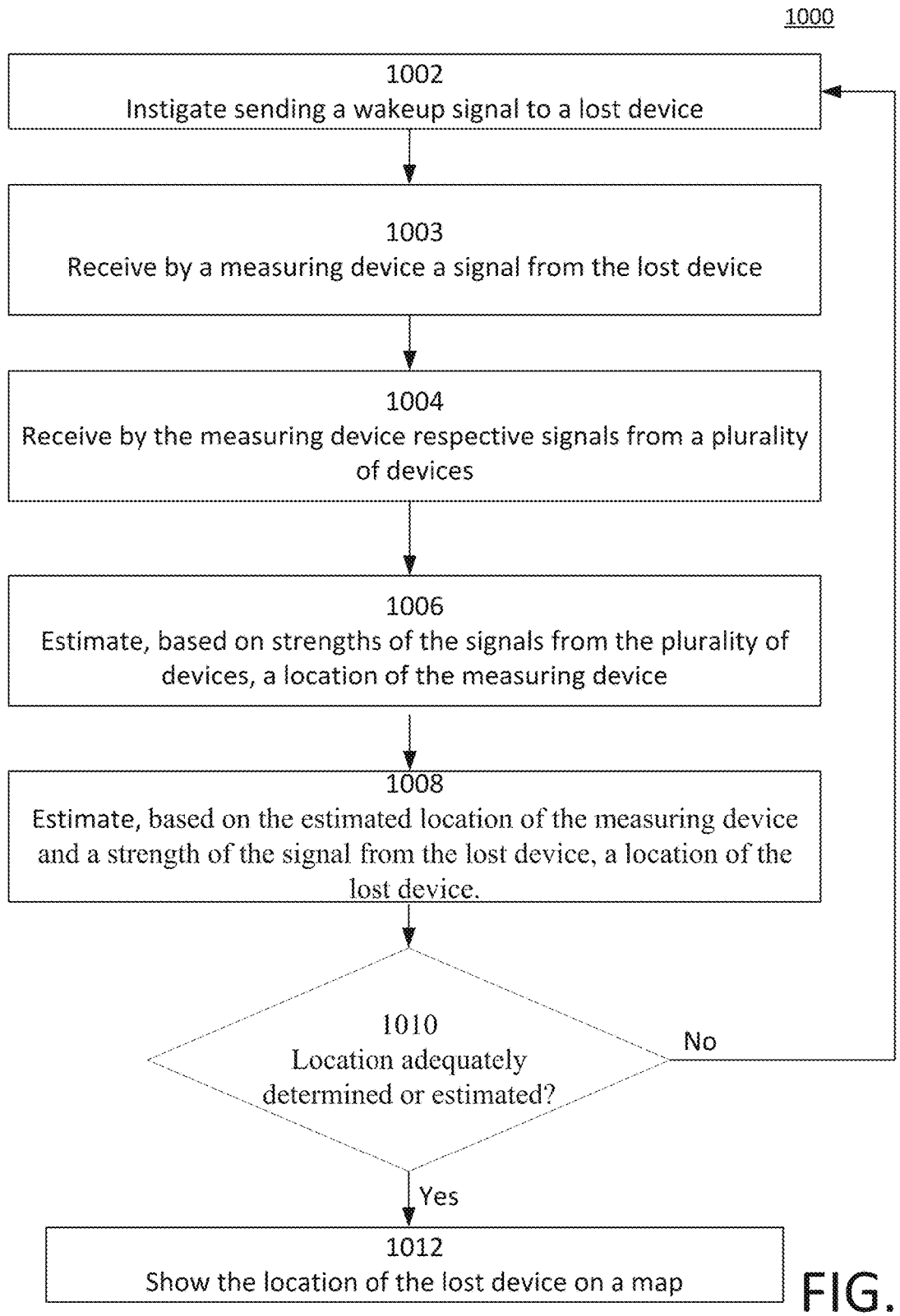
FIG. 10 shows an example method.

FIG. 10 shows a method 1000. The method 1000 may generally be implemented to, for example, find a lost device (or estimate its location) in a premises, such as, for example, a tablet or laptop lost under a bed, etc. At step 1002, a signal may be sent to wake up the lost device. For example, the lost device may be asleep or otherwise inactive. A measuring device for measuring a strength of signals sent on a network in a premises may ping the lost device to instigate the lost device to send a signal. A signal further may be sent to the lost device as well as to other devices in the premises to aid in determining the location of the measuring device as well as the location of the lost device. Alternatively or additionally, another device may ping the lost device such as any device on the network on which the lost device is also on, a gateway, or other device. At step 1003, a measuring device may receive a signal from the lost device. At step 1004, the measuring device may receiving signals from a plurality of other devices in the premises. At step 1006, an estimate may be made by the measuring device or by some other device within the premises, such as the gateway or any other device, or outside the premises such as a remote server. Specifically, an estimate may be made of the location of the measuring device when it received the signal from the lost device and/or the signals from the other devices. Such an estimate may be made based on the strengths of the signals from the plurality of devices.

The method 1000 may continue at step 1008 with the making of an estimate, based on the estimated location of the measuring device and a strength of the signal received from the lost device, of the location of the lost device. Such estimate may be made by the measuring device itself or by another device within the premises (such as the gateway or any other device) or by a device outside the premises (such as a remote server or other device). At step 1010, a determination may be made as to whether the location of the lost device is adequately determined or estimated. If not, then steps in the method 1000 may be repeated. For example, at step 1002, another ping may be sent to the lost device to instigate the lost device to send a signal. In the event that the lost device already is communicating, then step 1002 may not be repeated. Steps 1003, 1004, 1006, and 1008 may be repeated once or any number of times in iterative fashion as described herein, either until an established number of iterations have been completed or the location of the lost device has been adequately determined or estimated. When the lost device's location has been adequately determined or estimated, then at step 1012, the location of the lost device may be shown on a map or other visualization of the premises.

Figure 11:
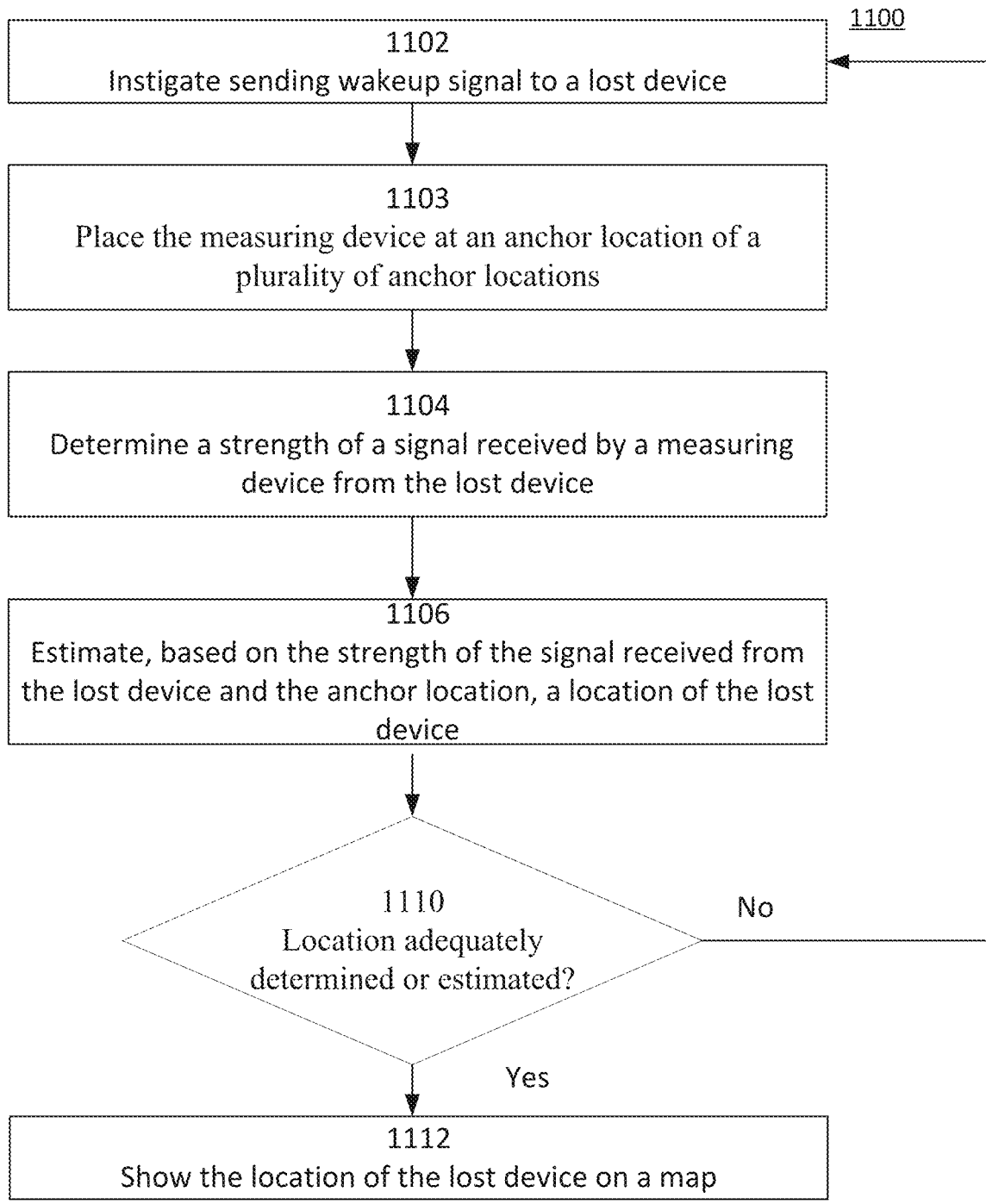
FIG. 11 shows an example method.

FIG. 11 shows a method 1100. The method 1100 may be implemented to, for example, locate a lost device in a premises, such as, for example, a tablet or laptop lost under a bed, etc. In implementing the method 1100, anchor points such as described herein and with respect to anchor points 1 through 14 in FIG. 2, may be used to aid in determining or estimating a location of a lost device.

At step 1102, a signal to wake up the lost device may be sent. For example, the lost device may be asleep or otherwise inactive. A measuring device for measuring a strength of signals sent on a network in a premises may ping the lost device to instigate the lost device to send a signal. Alternatively or additionally, another device may ping the lost device such as any device on the network on which the lost device is also on, a gateway, or other device. At step 1103, a measuring device for measuring strengths of received signals may be placed at an anchor point of a plurality of anchor points at the premises. At step 1104, the measuring device may receive a signal from the lost device and determine its strength. At step 1106, an estimate may be made by the measuring device or by some other device within the premises, such as the gateway or any other device, or outside the premises such as a remote server. Specifically, an estimate may be made of the location of the lost device based on the strength of the signal received from the lost device and the anchor point at which the measuring device was placed when measuring the strength of the signal from the lost device.

The method 1100 may continue at step 1110 with a determination as to whether the location of the lost device is adequately determined or estimated. If not, then steps in the method 1100 may be repeated. For example, at step 1102, another ping may be sent to the lost device to instigate the lost device to send a signal. In the event that the lost device already is communicating, then step 1102 may not be repeated. Steps 1103, 1104, and 1106 may be repeated once or any number of times in iterative fashion as described herein, either until an established number of iterations have been completed or the location of the lost device has been adequately determined or estimated. When the lost device's location has been adequately determined or estimated, then at step 1112, the location of the lost device may be shown on a map or other visualization of the premises.

Figure 12:
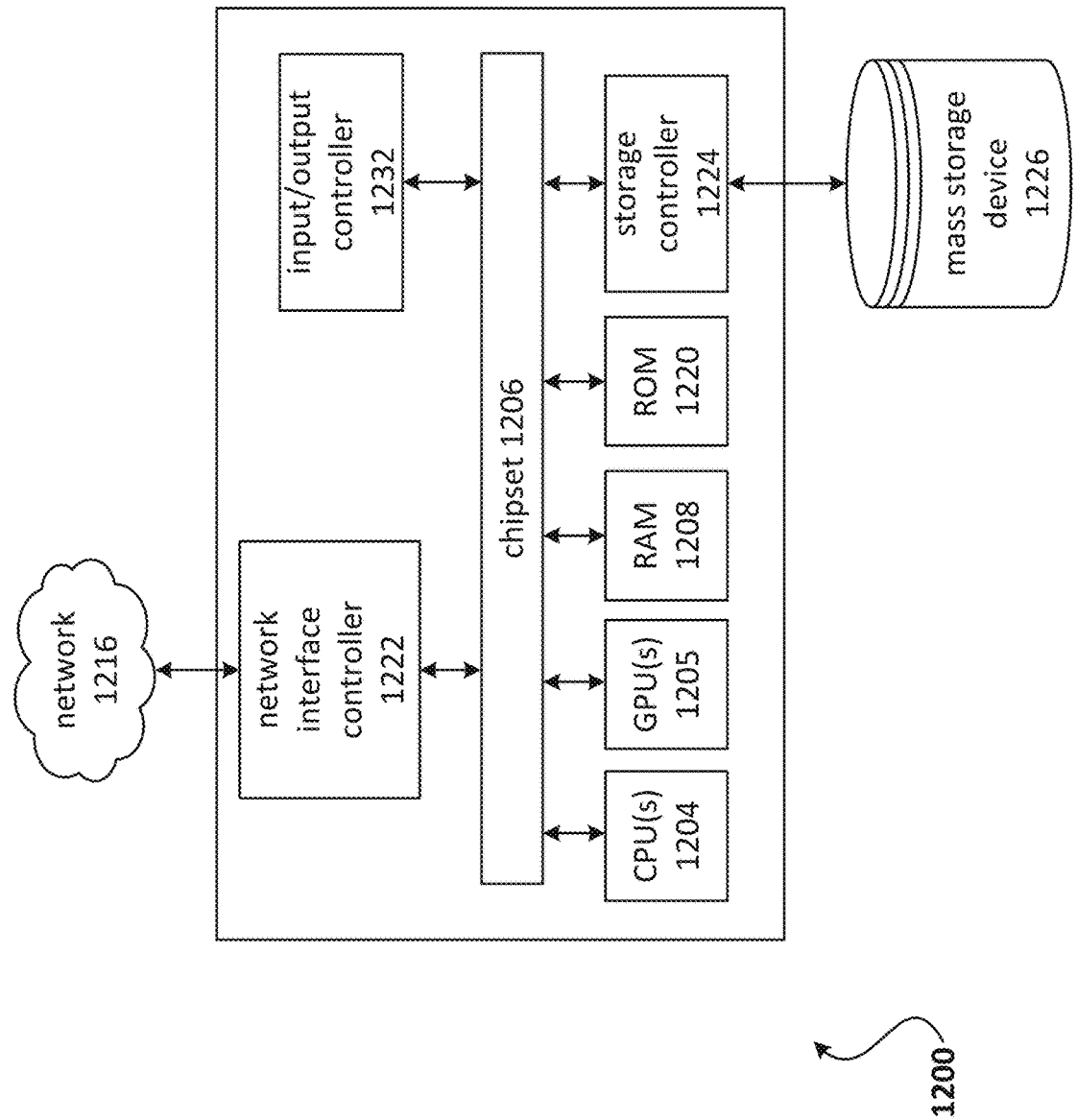
FIG. 12 shows an example computing device.

FIG. 12 shows an example computing device that may be used in various aspects, such as the servers, modules, and/or devices shown in FIGS. 1, 2, 4, 5 and 6. With regard to the example architecture of FIG. 1, for example, the various devices in communication, whether directly or indirectly, with the gateway 108 (and the gateway 108) itself, may each be implemented in an instance of a computing device 1200 of FIG. 12. The computer architecture shown in FIG. 12 illustrates a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 8-11.

The computing device 1200 may comprise a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random access memory (RAM) 1208 used as the main memory in the computing device 1200. The chipset 1206 may provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN) 1216. The chipset 1206 may comprise functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1226 that provides non-volatile storage for the computer. The mass storage device 1226 may store system programs, application programs, other program modules, and data, which have been described in greater detail herein. The mass storage device 1226 may be connected to the computing device 1200 through a storage controller 1224 connected to the chipset 1206. The mass storage device 1226 may consist of one or more physical storage units. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on a mass storage device 1226 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 1226 is characterized as primary or secondary storage and the like.

For example, the computing device 1200 may store information to the mass storage device 1226 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may read information from the mass storage device 1226 by detecting the physical states or characteristics of one or more particular locations within the physical storage units.

In addition to the mass storage device 1226 described herein, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may comprise volatile and non-volatile, transitory computer-readable storage media and non-transitory computer-readable storage media, and removable and non-removable media implemented in any method or technology. Computer-readable storage media comprises, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1226 shown in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 1226 may store other system or application programs and data utilized by the computing device 1200.

The mass storage device 1226 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described herein. The computing device 1200 may have access to computer-readable storage media storing computer-executable instructions, which, when executed by the computing device 1200, may perform the methods described in relation to FIGS. 8-11.

A computing device, such as the computing device 1200 shown in FIG. 12, may also comprise an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not comprise all of the components shown in FIG. 12, may comprise other components that are not explicitly shown in FIG. 12, or may utilize an architecture completely different than that shown in FIG. 12.

As described herein, a computing device may be a physical computing device, such as the computing device 1200 of FIG. 12. A computing node may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another embodiment comprises from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed.

The present methods and systems may be understood more readily by reference to the detailed description and the examples comprised therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively or additionally, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   determining, for a first location in a premises, a first signal strength associated with a first signal sent by a first device;
   determining, for a second location in the premises, a second signal strength associated with a second signal sent by the first device;
   determining, based at least in part on the first signal strength and the second signal strength, an estimation of the first location and an estimation of the second location; and
   determining, based on the estimation of the first location and the estimation of the second location, an estimation of a location of the first device.

2. The method of claim 1, wherein the determining the estimation of the first location is based, at least in part, on an estimation of a gain associated with the first device.

3. The method of claim 1, further comprising:
   determining a map of the estimation of the location of the first device in the premises.

4. The method of claim 3, further comprising:
   causing output, on a computing device, of the map of the estimation of the first location of the first device.

5. The method of claim 1, wherein the first signal strength is measured by a measuring device, and wherein the measuring device is not an intended recipient of the first signal.

6. The method of claim 1, wherein the determining the estimation of the location of the first device is performed, at least in part, utilizing a computing device located outside of the premises.

7. The method of claim 1, further comprising:
   receiving a label for the first location.

8. The method of claim 1, further comprising:
   receiving a coordinate for the first location.

9. The method of claim 1, further comprising:
   determining an estimation of gain associated with the first device, wherein the determining the estimation of the location of the first device is further based on the estimation of the gain.

10. A method comprising:
    receiving a first signal at a first location in a premises, wherein the first signal is sent by a lost device located at the premises;
    determining an estimation of the first location; and
    determining, based on the estimation of the first location and a first strength associated with the first signal, an estimation of a location of the lost device.

11. The method of claim 10, wherein the determining the estimation of the first location is based, at least in part, on an estimation of a gain associated with the lost device.

12. The method of claim 10, wherein the determining the estimation of the first location comprises:
    reviewing a map of a plurality of anchor points associated with the premises, wherein the first location is a first anchor point of the plurality of anchor points.

13. The method of claim 12, further comprising:
    receiving a second strength associated with a second signal sent by the lost device and received at a second location,
    wherein the second location is a second anchor point of the plurality of anchor points, and
    wherein determining the estimation of the location of the lost device is further based on the second strength and the second location.

14. The method of claim 10, further comprising:
    receiving a second strength associated with a second signal sent by a second device, wherein the determining the estimation of the first location is based, at least in part, on the second strength.

15. The method of claim 10, further comprising:
determining a map of the estimation of the location of the lost device.

16. A device comprising:
one or more processors; and
memory storing instructions that, when executed by the one or more processors, cause the device to:
  determine, for a first location in a premises, a first signal strength associated with a first signal sent by a first device;
  determine, for a second location in the premises, a second signal strength associated with a second signal sent by the first device;
  determine, based at least in part on the first signal strength and the second signal strength, an estimation of the first location and an estimation of the second location; and
  determine, based on the estimation of the first location and the estimation of the second location, an estimation of a location of the first device.

17. The device of claim 16, wherein the determining the estimation of the first location is based, at least in part, on an estimation of a gain associated with the first device.

18. The device of claim 16, wherein the instructions, when executed by the one or more processors, further cause the device to:
  determine a map of the estimation of the location of the first device in the premises.

19. The device of claim 18, wherein the instructions, when executed by the one or more processors, further cause the device to:
  cause output, on a computing device, of the map of the estimation of the first location of the first device.

20. The device of claim 16, wherein the instructions, when executed by the one or more processors, further cause the device to:
  determine an estimation of gain associated with the first device, wherein the determining the estimation of the location of the first device is further based on the estimation of the gain.

* * * * *